United States Patent

[11] 3,552,707

| [72] | Inventor | Akira Tanaka |
| | | Northridge, Calif. |
| [21] | Appl. No. | 831,123 |
| [22] | Filed | June 6, 1969 |
| [45] | Patented | Jan. 5, 1971 |
| [73] | Assignee | General Motors Corporation |
| | | Detroit, Mich. |
| | | a corporation of Delaware |

[54] MANUALLY OPERABLE SEAT ADJUSTER MECHANISM
6 Claims, 7 Drawing Figs.

[52] U.S. Cl.................................................. 248/394,
248/396, 248/419, 248/423; 297/325
[51] Int. Cl.................................................F16m 11/24
[50] Field of Search........................................... 248/396,
394, 419, 420, 423, 429, 430; 297/325, 327

[56] References Cited
UNITED STATES PATENTS
7,224  3/1850  Searle........................... 297/328

| 2,132,009 | 10/1938 | Ball.............................. | 248/394 |
| 2,795,267 | 6/1957 | Williams....................... | 248/394 |
| 3,147,945 | 9/1964 | Leslie et al.................... | 248/394 |
| 3,460,793 | 8/1969 | Posh............................. | 248/394 |

FOREIGN PATENTS

| 1,323,334 | 2/1963 | France......................... | 248/420 |
| 1,388,259 | 12/1964 | France......................... | 248/423 |

*Primary Examiner*—Marion Parsons, Jr.
*Attorneys*—J. L. Carpenter and E. J. Biskup

ABSTRACT: A manually operable seat adjuster mechanism for supporting a vehicle seat on a base for selective tilting movement about first and second horizontal axes located respectively adjacent to the front end and the rear end of the seat and extending normal to the longitudinal axis of the vehicle. The mechanism is characterized by having a pair of lever members pivotally interconnected and interposed between the base and the seat and supported for adjustable movement to a plurality of vertically spaced positions to permit height adjustment of either the front end or the rear end of the seat.

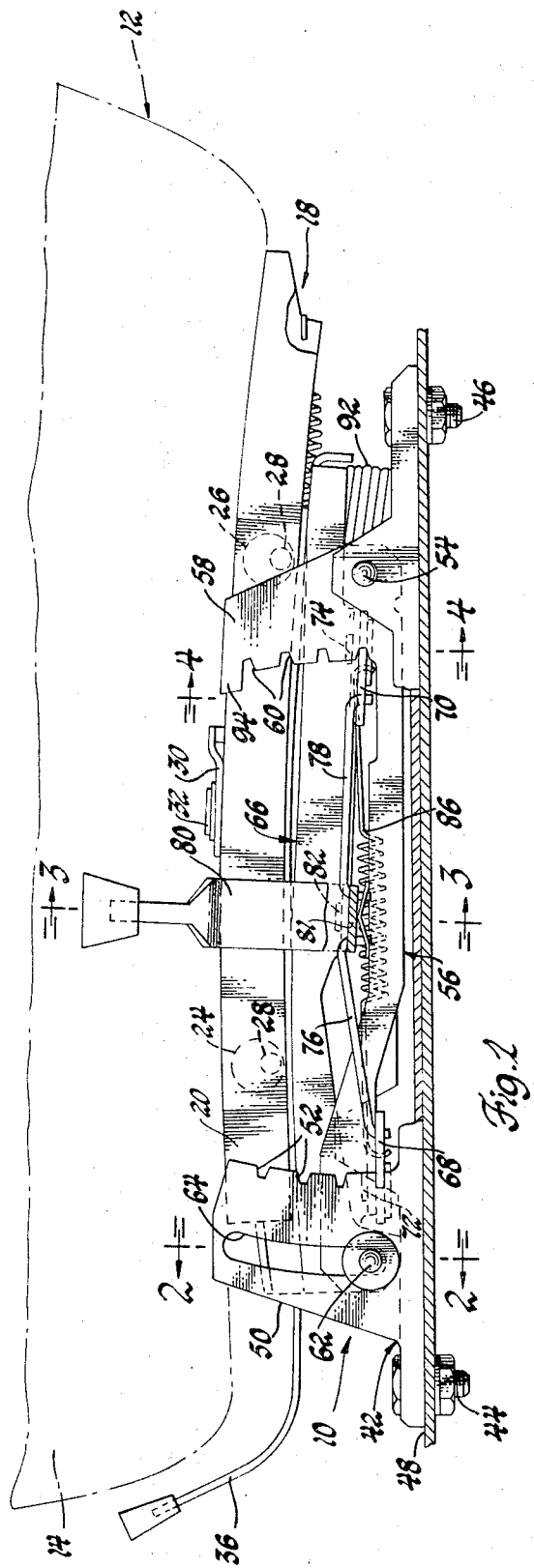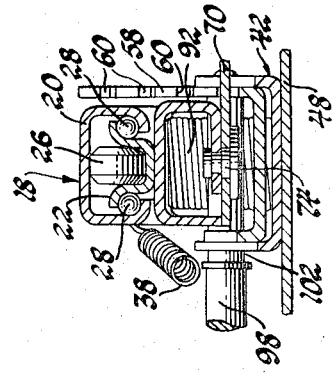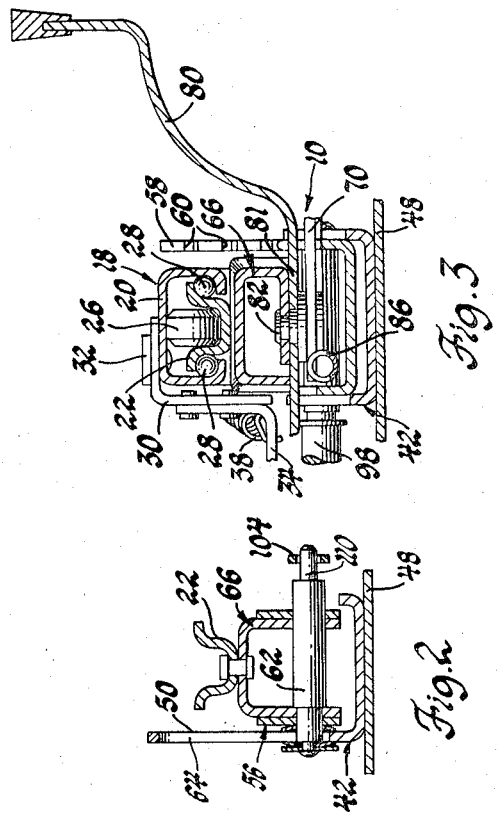

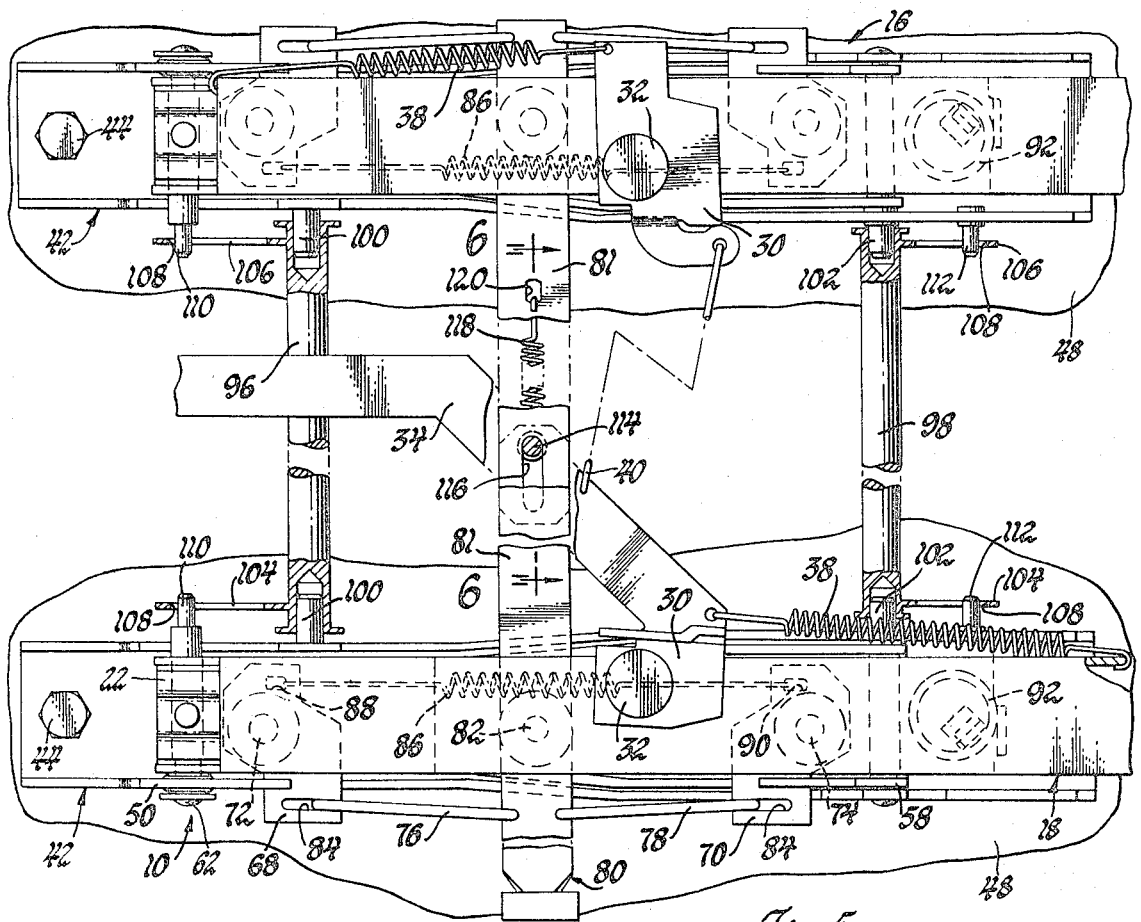

MANUALLY OPERABLE SEAT ADJUSTER MECHANISM

This invention concerns a seat adjuster mechanism which can be used in a motor vehicle for providing adjustable positioning of the vehicle seat so as to enable the driver to have a more comfortable driving position. In the preferred form the mechanism made according to the invention includes an elongated support member rigidly secured to the vehicle floor and located in a vertical plane parallel to the longitudinal axis of the vehicle. A first lever member has one end thereof pivotally connected to the support member along a first horizontal axis located adjacent the rear end of the seat. A second lever member has the upper end thereof rigidly secured to the underside of the seat and has one end thereof pivotally connected to the first lever member along a second horizontal axis located adjacent the front end of the seat. Both lever members are adapted to move about their support pivots in the vertical plane of the support member and can be selectively placed in locked positions through a locking arrangement which includes a pair of lockbars and vertically spaced notches formed in the support member and the first lever member. Release means in the form of a manually operated actuator is pivotally carried by one of the lever members and is operatively connected with the lockbars so that movement of the actuator in one direction releases one of the lockbars only and permits vertical positioning of one end of the seat, while movement of the actuator in the opposite direction causes the other lockbar to be withdrawn from the accommodating notch and permits positioning of the other end of the vehicle seat.

The objects of the present invention are to provide an adjuster mechanism which support a vehicle seat and permits the latter to have the front end or the rear end thereof raised or lowered to varying positions so as to accommodate vehicle operators of different stature; to provide a seat adjuster mechanism employing a pair of lever members which are pivotally interconnected and serve to support the seat on a base during adjustable movement of the seat between a plurality of vertically spaced positions; to provide a seat adjuster mechanism having a pair of pivotally interconnected levers which are located in a vertical plane parallel to the longitudinal axis of the vehicle and are independently movable about longitudinally spaced axes for selectively raising the front end or rear end of the vehicle seat; to provide a locking arrangement for a seat adjuster mechanism which serves to maintain the front end or the rear end of a seat in a predetermined locked position and includes lockbars movable in a horizontal plane between a locked position wherein the lockbar is located within a notch and a released position wherein the lockbar is withdrawn from the notch by movement of a manually operated actuator carried by the adjusting mechanism; and to provide a seat adjuster device which serves to raise or lower either the front end or the rear end of a vehicle seat and can be combined with a track assembly which provides for fore-and-aft movement of the seat.

Further objects and advantages of the present invention will be derived from the following detailed description when taken with the drawings in which:

FIG. 1 is a side elevational view showing a seat adjuster mechanism made in accordance with the invention and incorporated with a vehicle seat;

FIGS. 2, 3 and 4 are sectional views taken on lines 2—2, 3—3 and 4—4, respectively, of FIG. 1;

FIG. 5 is a plan view of the adjuster mechanism shown in FIG. 1;

FIG. 6 is a view taken on line 6—6 of FIG. 5; and

FIG. 7 is a view similar to FIG. 1 but shows the seat adjuster mechanism with both the front end and rear end thereof raised relative to the vehicle floor.

Referring to the drawings and more particularly FIG. 1 thereof, a seat adjuster mechanism generally indicated by the numeral 10 is shown supporting a vehicle seat 12 comprising the usual seat cushion 14 and a seat back (not shown). The seat adjuster mechanism 10 is located along the outboard side of the vehicle seat 12, and as seen in FIG. 5, a similar adjuster mechanism 16 having identical parts is located on the inboard side of the vehicle seat. The arrangement is such that the two adjuster mechanisms cooperate to provide for vertical positioning of either the front end or the rear end of the seat 12 in a manner to be more fully described hereinafter. A track system 18 interposed between the adjuster mechanism 10 and the seat 12 provides for fore-and-aft movement of the seat along an axis extending longitudinal of the vehicle.

More specifically and with reference to FIGS. 1, 3 and 4, it will be noted that the lower end of the seat cushion 14 is rigidly attached to and rests upon the aforementioned track system 18 which comprises an upper channel member 20 and a lower channel member 22. The respective channel members are interlocked in the usual manner and are combined with axially spaced roller members 24 and 26 and the usual ball bearings 28 which provide for substantially nonfrictional movement of the upper channel member 20 during fore-and-aft adjustment of the vehicle seat 12. As seen in FIGS. 3 and 5, a lock member 30 is mounted on the upper channel member 20 by a pivotal connection 32 and is secured to a lever 34 which extends forwardly in a substantially horizontal plane toward the front of the seat 12 and terminates with an upstanding handle 36. Movement of the handle 36 in a counterclockwise direction about the pivotal connection 32, causes the lock member 30 to move against the force of a spring 38 to release the upper channel member 20 from the lower channel member 22 and permit fore-and-aft adjustment of the vehicle seat 12. It will be noted that a rod 40 connected between the lever 34 and the lock member 30 associated with the seat adjuster mechanism 16 on the inboard side of the seat 12 provides for simultaneous release of the track system 18 associated therewith. Track systems of this type are well known to those skilled in the art, and, therefore, further description of the details of construction of this type of device is not deemed to be necessary.

The seat adjuster mechanism 10 comprises an elongated support member 42 which is a stamped sheet metal part generally U-shaped in cross section and having the forward and rearward ends thereof rigidly secured by bolts 44 and 46 to the vehicle floor or base 48. An upstanding flange 50 is integrally formed with the outboard leg of the support member 42 and includes a plurality of equally and vertically spaced notches 52 which are located along an arc having its center positioned along a transverse horizontal axis passing through a pivot pin 54 carried by the rear end of the support member 42. The pivot pin 54 extends through one end of a primary lever member 56 which is also a stamped sheet metal part having a generally U-shaped cross section. As in the case of the support member 42, the primary lever member 56 is integrally formed with an upstanding flange 58 which also has a plurality of equally and vertically spaced notches 60 formed therein along an arc, the center of which is located along a horizontal axis provided by a pivot pin 62 secured to the front or free end of the primary lever member 56. As seen in FIGS. 1 and 2, one end of the pivot pin 62 is slidably retained within a curved slot 64 formed within the flange 50 and serves to provide lateral stability for the adjuster mechanism when the latter assumes various positions during height adjustment of the vehicle seat 12. The pivot pin 62 also supports the front end of a secondary lever member 66 which as in the case of the primary lever member 56 and support member 42 is also a stamped sheet metal part of a generally U-shape in cross section. The upper surface of the secondary lever member 66 is rigidly secured to lower channel member 22 of the track system 18 and, accordingly, it should be apparent that any movement of the lever member 66 necessarily results in corresponding movement of the vehicle seat 12. In other words and with reference to FIG. 1, counterclockwise movement of the secondary lever member 66 about the pivot pin 62 will result in upward movement of the rear end of the seat, while clockwise movement of the primary lever member 56 about the pivot pin 54 will result in upward movement of the front end of the seat. In order to maintain the vehicle seat 12 in a desired adjusted position, locking means are provided which will be described now.

The locking means mentioned above comprise a pair of axially spaced lockbars 68 and 70 which cooperate with the notches 52 and 60 formed respectively in the flanges 50 and 58 for selectively locking the front end and the rear end of the adjuster mechanism 10 in a desired position. In this regard, it will be noted that the lockbars 68 and 70 are similar in shape and are carried by pivotal connections 72 and 74 located respectively on the primary lever member 56 and the secondary lever member 66. Each pivotal connection 72 and 74 provides for movement of the associated lockbar about a vertical axis so that the lockbar moves in a substantially horizontal plane during such movement. Rods 76 and 78 are connected with an actuator 80 having a crossbar 81 which is supported by a pivotal connection 82 located at an intermediate point on the secondary lever member 66. As seen in FIG. 5, a slot 84 formed in each of the lockbars 68 and 70 accommodates the associated rod and provides lost-motion movement thereof when the actuator 80 is pivoted in one direction as will be more fully explained hereinafter. A spring 86 has one end thereof located within an aperture 88 formed in the lockbar 68 and the other end located within a similar aperture 90 formed in the lockbar 70. The spring 86 serves to exert a continuous force on the lockbars 68 and 70 urging the latter into the notches formed in the flanges 50 and 58. Thus as seen in FIG. 1, the seat adjuster mechanism 10 is in the fully lowered position and maintains this position by having the lockbars 68 and 70 located within the lowermost notch formed in each of the flanges 50 and 58.

As in the case of all manually operated seat adjuster mechanisms, movement of the vehicle seat occurs when the seat occupant shifts his weight forwardly or rearwardly after releasing the appropriate end of the adjuster mechanism. Thus, in order to raise the front end of the seat, the seat occupant leans rearwardly against the seat back and applies sufficient force thereto causing the front end of the seat to rise. To raise the rear end of the seat, the seat occupant shifts his weight forwardly, and most seat adjuster mechanisms provide a counterbalance spring to assist such movement. As seen in FIGS. 1 and 7, a coil spring 92 is interposed between the support member 42 and the secondary lever member 66 adjacent to the rear end of the vehicle seat 12 and provides the added force for facilitating the raising of the rear end of the seat.

The operation of the seat adjuster mechanism 10 described above is as follows:

FIG. 1, as mentioned above, shows the seat adjuster mechanism 10 in the fully lowered position. This position is maintained by having both of the lockbars 68 and 70 located in one of the associated notches formed in flanges 50 and 58 of the support member 42 and the primary lever member 56. When the seat occupant wishes to raise the front end of the vehicle seat 12 relative to the vehicle floor 48, he merely grasps the actuator 80 and moves it rearwardly thereby causing the rod 76, as seen in FIG. 5, to move the lockbar 68 in a counterclockwise direction out of engagement with the lowermost notch 52 formed in the flange 50 so as to free the forward end of the primary lever member 56. It will be noted that during this time, the rear end of the rod 78 shifts within the slot 84 with no effect on the lockbar 70. The seat occupant then leans rearwardly so as to exert a force against the seat back, as alluded to hereinbefore, which will then cause the front end of the primary lever member 56 together with the front end of the secondary lever member 66 to pivot about the pivot pin 54 in a clockwise direction as viewed in FIG. 1. Assuming the seat occupant immediately releases the actuator 80, after moving the latter rearwardly and tilting the seat back in the same direction, the actuator 80 will then automatically return to the neutral position of FIG. 5 and the lockbar 68 will then move into the second notch 52 from the bottom under the influence of the spring 86. The position then assumed by the front end of the seat adjuster mechanism 10 will be as seen in FIG. 7.

For moving the rear end of the vehicle seat 12 to a raised position from the position shown in FIG. 1, the seat occupant will shift the actuator 80 forwardly so as to cause the rod 78 to pivot the lockbar 70 in a clockwise direction and retract it from the lowermost notch 60 formed in the flange 58. As a result, the rear end of the secondary lever member 66 will be released, while the forward end of rod 76 moves within the slot 84 with no effect on the lockbar 68. Thereafter, the seat occupant will lean forwardly, and with the assistance of the spring 92, the rear end of the secondary lever member 66 will pivot in a counterclockwise direction about pivot pin 62 causing the rear end of the vehicle seat 12 to rise to the desired position. As should be apparent, depending upon when the actuator 80 is released by the seat occupant so it may automatically return to the neutral position will determine the extent of upward movement which the rear end of the vehicle seat 12 will attain. Thus as seen in 7, the actuator 80 was released by the seat occupant after the lockbar 70 had moved above the second notch 60 from the bottom. Thereafter, the spring 86 causes the lockbar 70 to be pivoted into engagement with the third notch 60. Had the seat occupant maintained the actuator 80 in the forward position without releasing it, the rear end of the vehicle seat 12 would move until the lockbar 70 engaged a tongue 94 formed with the flange 58 at the upper end thereof. This tongue 94 acts as a positive stop for limiting upward movement of the rear end of the seat adjuster mechanism 10. An upward limit stop for the front end of the seat adjuster mechanism 10 is provided by the slot 64 formed in the flange 50.

As mentioned before and as shown in FIG. 5, a seat adjuster mechanism 16 having identical parts is located on the inboard side of the vehicle seat 12. In order to correlate movement of the two seat adjuster mechanisms 10 and 16, a pair of transverse shafts 96 and 98 are provided having the opposite ends thereof pivotally carried by projections 100 and 102 rigid with the support member 42 of each mechanism. Radially extending arms 104 and 106 each have one end thereof secure to the associated shaft and include an elongated slot 108 for accommodating a projection such as the projection 110 rigid with the movable pivot pin 62 and projection 112 rigidly secured to the rear end of the secondary lever member 66. Similarly, the movement of the crossbar 81 of the seat adjuster mechanism 10 is transmitted to the corresponding crossbar 81 incorporated with the seat adjuster mechanism 16 through a pin and slot connection which, as seen in FIG. 6, is formed at the inner end of both crossbars. In this regard, it will be noted that the crossbar 81 associated with the seat adjuster mechanism 10 terminates with a pin 114, while the crossbar 81 associated with the other seat adjuster mechanism terminates with a slot 116. A spring 118 has one end thereof wrapped around the pin 114, while the other end is fixed within an aperture 120. Thus, when the actuator 80 is shifted forwardly or rearwardly as hereinbefore described, the pin 114 is pivoted about the pivotal connection 82 in an opposite direction causing pivotal movement of the crossbar 81 associated with the seat adjuster mechanism 16. As a result, the same ends, either front or rear, of the seat adjuster mechanisms 10 and 16 are simultaneously unlocked to permit adjustable movement of the vehicle seat. It should be apparent that when the actuator 80 is released, the spring 118 serves to automatically return the actuator to the neutral position alluded to above.

I claim:

1. In combination with a seat for a vehicle, a said seat having a front end and a rear end, a manually operable seat adjuster mechanism for supporting said seat on a base for tilting movement about first and second horizontal axes located respectively adjacent said front end and rear end of the seat and extending normal to the longitudinal axis of said vehicle, said mechanism comprising an elongated support member rigidly secured to said base and located in a vertical plane parallel to said longitudinal axis, a first lever member having one end thereof pivotally connected to said support member along one of said horizontal axes so as to permit the free end of said first lever member to move relative to said support member, a second lever member having the upper surface thereof rigidly secured to the underside of said seat and having one end thereof pivotally connected to said first lever member along the other of said horizontal axes so as to permit the other end of said second lever member to move relative to said first lever member and said support member, first locking means located between said support member and said first lever member and positioned adjacent said other of said horizontal axes for locking the free end of said first lever member in a plurality of vertically spaced positions, second locking means located between said first and said second lever members adjacent said one of said horizontal axes for locking the other end of the second lever member in a plurality of vertically spaced positions, and release means carried by one of said lever members and operatively connected with said first and second locking means for selectively releasing the latter so as to provide vertical adjustment of the front end and the rear end of the vehicle seat about said first and second horizontal axes.

2. In combination with a seat for a vehicle, said seat having a front end and a rear end, a manually operable seat adjuster mechanism for supporting said seat on a base for tilting movement about first and second horizontal axes located respectively adjacent said front end and rear end of the seat and extending normal to the longitudinal axis of said vehicle, said mechanism comprising an elongated support member rigidly secured to said base and located in a vertical plane parallel to said longitudinal axis, a first lever member having one end thereof pivotally connected to said support member along one of said horizontal axes so as to permit the free end of said first lever member to move in the vertical plane of said support member, a second lever member being rigidly secured to the underside of said seat and having one end thereof pivotally connected to said first lever member along the other of said horizontal axes so as to permit the other end of said second lever member to move in said vertical plane of said support member, first locking means located between said support member and said first lever member and positioned adjacent said other of said horizontal axes for locking the free end of said first lever member in a plurality of vertically spaced positions, second locking means located between said first and said second lever members adjacent said one of said horizontal axes for locking the other end of the second lever member in a plurality of vertically spaced positions, and release means carried by one of said lever members and operatively connected with said first and second locking means for selectively releasing the latter so as to provide vertical adjustment of the front end and the rear end of the vehicle seat about said first and second horizontal axes.

3. The combination of claim 2 wherein said first and second locking means each include a lockbar supported for pivotal movement in a substantially horizontal plane.

4. The combination of claim 3 wherein said support member and said first lever member are each formed with an upstanding flange having a plurality of vertically spaced notches cooperating with the lockbar of the first and second locking means for locking the seat in an adjusted position.

5. In combination with a seat for a vehicle, said seat having a front end and a rear end, a manually operable seat adjuster mechanism for supporting said seat on a base for tilting movement about first and second horizontal axes located respectively adjacent said front end and rear end of the seat and extending normal to the longitudinal axis of said vehicle, said mechanism comprising an elongated support member rigidly secured to said base and located in a vertical plane parallel to said longitudinal axis, a first lever member having one end thereof pivotally connected to said support member along one of said horizontal axes, a second lever member being rigidly secure to the underside of said seat and having one end thereof pivotally connected to said first lever member along the other of said horizontal axes, said support member and said first lever member each having an upstanding flange rigid therewith formed with a plurality of vertically spaced notches, a first lock bar pivotally carried by said first lever member and normally biased into engagement with one of said notches formed with the upstanding flange of said support member for preventing tilting movement of said seat about said one of said horizontal axes, a second lockbar pivotally carried by said second lever member and normally biased into engagement with one of said notches formed with the upstanding flange of said first lever member for preventing tilting movement of said seat about said other of said horizontal axes, and a hand operated actuator pivotally connected to one of said lever members and operatively connected to said first and second lockbars in a manner whereby movement of said actuator in one direction causes the first lockbar to be retracted from the associated notch to permit adjustable movement of one end of said seat about said one of said horizontal axes and movement of said actuator in an opposite direction causes the second lockbar to be retracted from the associated notch to permit the other end of said seat to be adjustably tilted about said other of said horizontal axes.

6. In combination with a seat for a vehicle, said seat having a front end and a rear end, a pair of laterally spaced and manually operable seat adjuster mechanisms for supporting said seat on a base for tilting movement about first and second horizontal axes located respectively adjacent said front end and rear end of the seat and extending normal to the longitudinal axis of said vehicle, each of said mechanisms comprising an elongated support member rigidly secured to said base and located in a vertical plane parallel to said longitudinal axis, a first lever member having one end thereof pivotally connected to said support member along said second horizontal axis so as to permit the free end of said first lever member to move in the vertical plane of said support member, a second lever member having the upper surface thereof rigidly secured to the underside of said seat and having one end thereof pivotally connected to said free end of said first lever member along said first horizontal axis so as to permit the other end of said second lever member to move in said vertical plane of said support member, said support member adjacent the free end of the first lever member and said first lever member adjacent the other end of said second lever member each having an upstanding flange rigid therewith formed with a plurality of vertically spaced notches, a first lockbar pivotally carried by said first lever member and normally biased into engagement with one of said notches formed with the upstanding flange of said support member for preventing tilting movement of said seat about said second horizontal axis, a second lockbar pivotally carried by said second lever member and normally biased into engagement with one of said notches formed with the upstanding flange of said first lever member for preventing tilting movement of said seat about said first horizontal axis, and a hand operated actuator pivotally connected to one of said lever members and operatively connected to said first and second lockbars in a manner whereby movement of said actuator in one direction causes the first lockbar to be retracted from the associated notch to permit adjustable movement of the front end of said seat about said second horizontal axis and movement of said actuator in an opposite direction causes the second lockbar to be retracted from the associated notch to permit the rear end of said seat to be adjustably tilted about said first horizontal axis.